United States Patent [19]

McNay

[11] 3,995,109
[45] Nov. 30, 1976

[54] VERTICAL SYNC PULSE SENSOR AND SYNTHESIZER

[75] Inventor: Steven Ralph McNay, Aurora, Ill.

[73] Assignee: Motorola, Inc., Schaumburg, Ill.

[22] Filed: Oct. 6, 1975

[21] Appl. No.: 619,755

[52] U.S. Cl. ............................ 178/7.5 R; 178/7.5 S; 178/69.5 TV
[51] Int. Cl.² .................... H04L 7/00; H04N 5/08
[58] Field of Search .............. 178/69.5 TV, 69.5 F, 178/7.3 S, 7.5 S, 7.5 R; 360/37

[56] References Cited
UNITED STATES PATENTS

| | | | |
|---|---|---|---|
| 3,814,844 | 6/1974 | Waldspurger et al. | 360/37 |
| 3,930,122 | 12/1975 | Morita et al. | 178/7.3 S |

Primary Examiner—Robert L. Griffin
Assistant Examiner—Marc E. Bookbinder
Attorney, Agent, or Firm—Margaret Marsh Parker; James W. Gillman

[57] ABSTRACT

A vertical synchronizing signal for a CRT display is separated from a composite sync signal by combining in a NAND gate the composite signal and the output of a monostable multivibrator having a pulse width greater than the horizontal sync pulse width. When the vertical sync signal is not sufficiently high to trigger the sweep circuit, a sync signal sensor will allow an oscillator to free-run at a frequency very near the field rate. Vertical sync pulses of sufficiently high level are gated through the free-running oscillator, without oscillation, to the vertical sweep circuit where they are used to trigger a monostable multivibrator. The vertical hold control can be eliminated without endangering the CRT screen.

5 Claims, 3 Drawing Figures

VERTICAL SYNC PULSE SENSOR AND SYNTHESIZER

BACKGROUND OF THE INVENTION

This invention relates to the field of video sync signals for CRT display devices and more particularly to the provision of an improved digital vertical synchronization arrangement.

A CRT display device conventionally requires horizontal and vertical sweep signals in order to form a raster for the fields of the display. These sweep signals are produced by saw-toothed generators in the display device which are caused to sync with the synchronizing generator of the original signal by means of composite sync information included in the received signal above the black level. The composite sync information can be separated from the picture information by amplitude clipping. The composite sync signal is then separated into its horizontal and vertical components. The vertical component is processed in any of various ways to produce a control or trigger pulse for a free-running oscillator in the vertical sweep circuit which requires a hold control to keep it sufficiently close to the vertical sync frequency for synchronization to occur. When a weak or noisy video signal is received, the output of a typical sync separator may not include a vertical sync signal strong enough to sync the saw-tooth generator in the vertical sweep circuit and thereby prevent "rolling" of the display. Another approach would be to have a "one-shot" ocsillator triggered by each input sync pulse, but, in this case, if the input disappears, the vertical sweep would cease. The resultant horizontal line could damage the fluorescent screen of the display device.

Many methods of dealing with these twin problems have been devised, but did not completely eliminate the need for a hold control in the vertical sweep circuit.

SUMMARY OF THE INVENTION

Thus, it is an object of the present invention to provide an improved vertical synchronization arrangement for a video display device which, inter alia, eliminates the need for a vertical hold control.

According to the present invention, the above objectives are achieved by using a digital vertical pulse sensor to sense the received vertical sync information, and to control the function of a free-running oscillator in the sync circuit thereby. When the vertical sync pulses are clearly defined, the free-running oscillator is not allowed to oscillate and a monostable oscillator in the vertical sweep circuit is triggered by the received vertical sync information. If, on the other hand, the received pulses are too weak or noisy, they are blocked by the sensor and the free-running oscillator provides the triggering pulses to keep the sweep oscillator running at a frequency close to the vertical frame rate until a suitable sync signal is available, thus protecting the display screen.

BRIEF DESCRIPTION OF THE DRAWING

In order that the invention may be clearly understood, one embodiment thereof will now be described by way of example, with reference to the accompanying drawings in which.

DETAILED DESCRIPTION OF A PREFERRED EMBODIMENT

Figure 1:
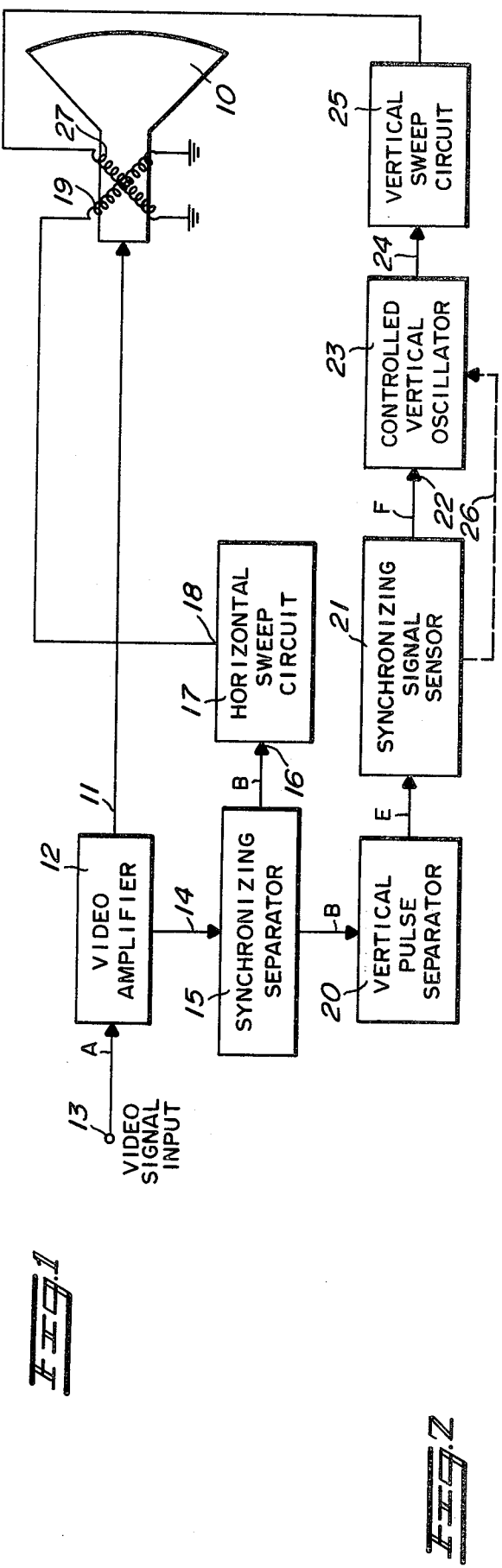
FIG. 1 is a block diagram of a system including the invention.

Referring now more particularly to the drawing, in a preferred embodiment of the invention as shown in the block diagram of FIG. 1, a CRT display device 10 receives picture information from a first output 11 of a video amplifier 12 having, in turn, a video signal A (see FIG. 3) at its input 13. A second output 14 of the amplifier 12 is connected to a sync separator 15 which separates the composite sync signal B from the picture information. The signal B from the sync separator 15 is connected to an input 16 of a horizontal sweep circuit 17, an output 18 of the horizontal sweep circuit being connected to horizontal deflection coils 19 of the CRT display device 10. The signal B is also connected to a vertical pulse separator 20 which removes the horizontal sync pulses and sends only a serrated vertical sync signal E to a sync signal sensor 21. E represents, then, the vertical sync portion of A (or B or D) displaced by the width of one pulse of the monostable multivibrator in the vertical pulse separator 20. The sensor 21 which senses the usability of the signal E is connected to an input 22 of a controlled vertical oscillator 23. If signal E is a clearly defined vertical sync pulse (Ea), not too noisy or weak for satisfactory synchronization, it is passed through to oscillator 23 whereby oscillation therein is prevented as will be hereinafter explained and the signal Fa (Ea inverted) is passed on to an input 24 of a vertical sweep circuit 25. Phantom connection 26 represents the control function exerted on oscillator 23 by sensor 21. The sweep circuit 25 includes a monostable multivibrator (not shown) which is triggered by signal G and provides control voltage for vertical deflection coils 27 of the CRT display device 10. If, however, signal A is excessively noisy or of insufficient amplitude to provide a trigger for the monostable multivibrator in the sweep circuit 25, the sensor 21 does not pass signal E but, instead, allows the controlled vertical oscillator 23 to oscillate and provide a trigger for the monostable in the sweep circuit 25.

Figure 2:
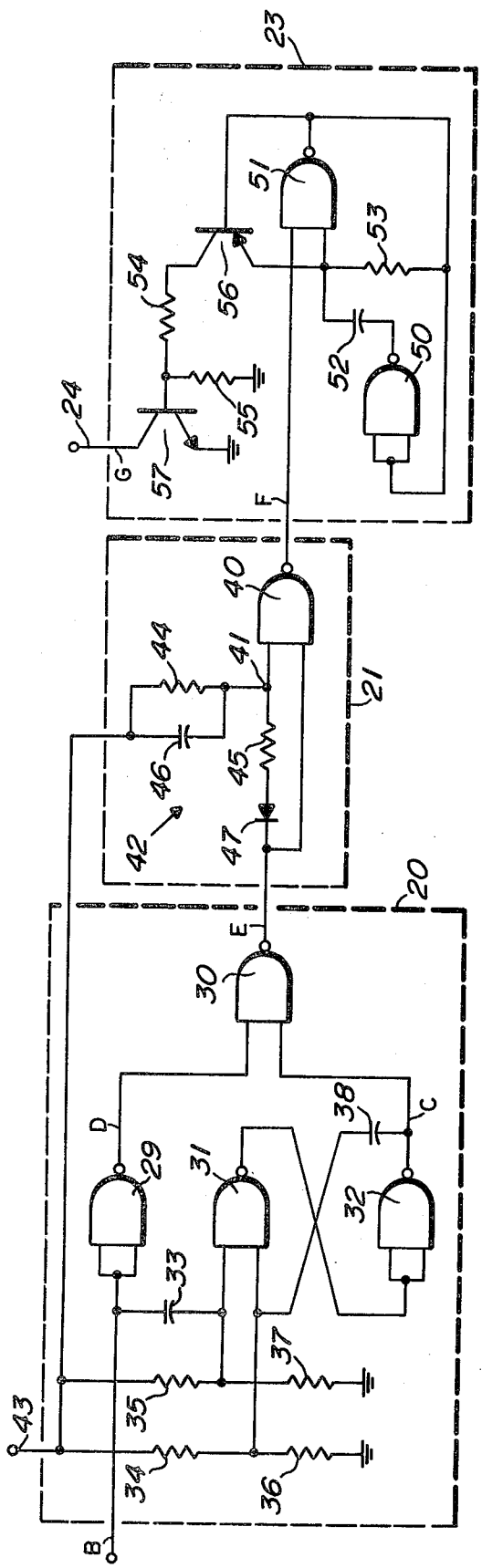
FIG. 2 is a schematic diagram of a circuit according to the invention.
Figure 3:
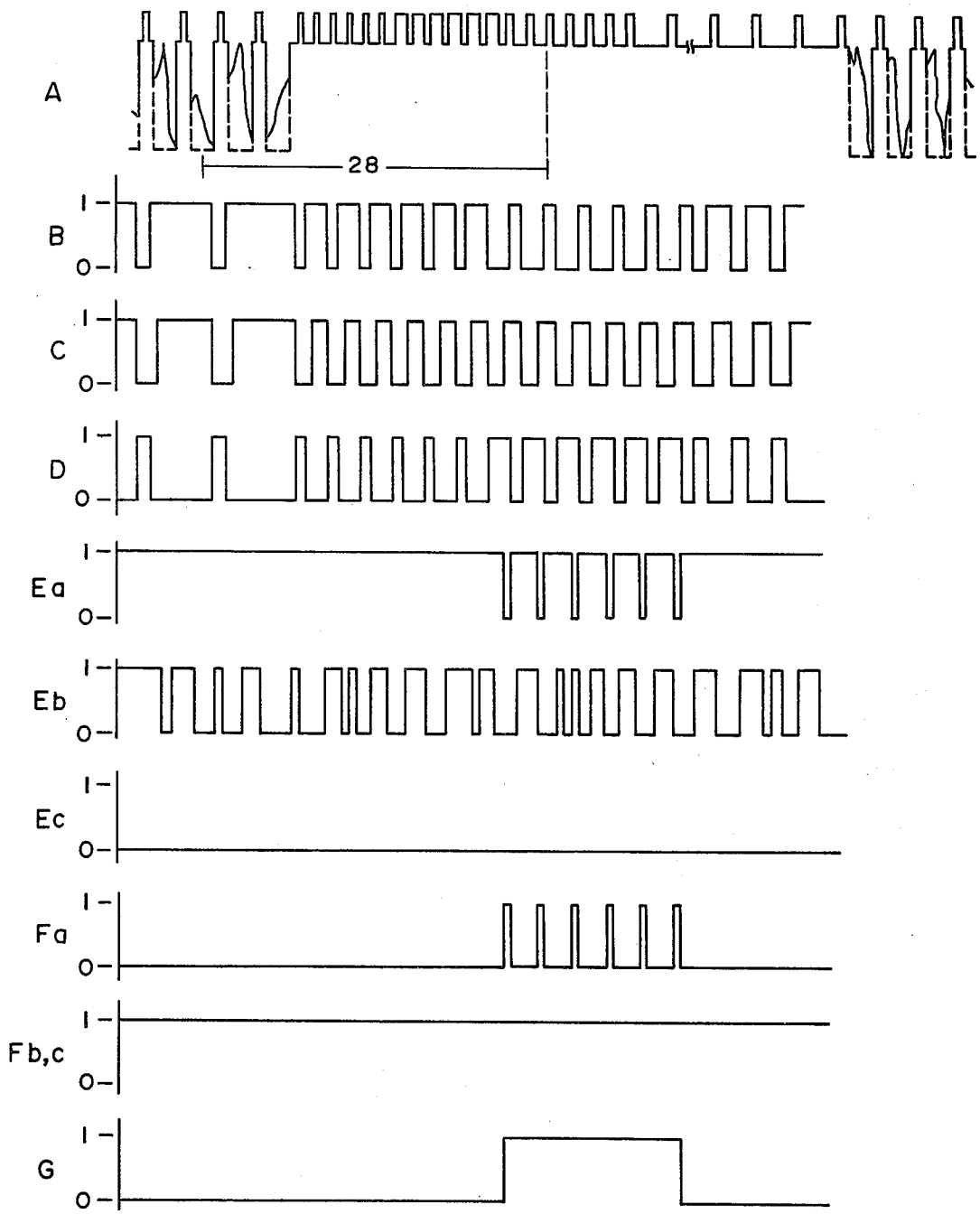
FIG. 3 is a chart of waveforms at selected points on the circuit of FIGS. 1 and 2.

In FIG. 2, the vertical pulse separator 20, the vertical signal sensor 21 and the controlled vertical oscillator 23 are given in schematic form and are best understood as exemplifying the present invention when considered in relation to the waveforms of FIG. 3. It should be noted that, while NAND gates are shown in the schematic, no limitation thereto is intended.

Waveform A of FIG. 3 represents the portion of a video signal containing the horizontal blanking period which includes the synchronizing information. The waveform for only one field is shown as the function of the present invention is essentially the same for each field. The waveform B at the input of the vertical pulse separator 20 is the ideal composite sync signal, i.e, the combined horizontal and vertical synchronizing information which is obtained from the portion 28 of waveform A by amplitude clipping and inversion. This waveform B is inverted in NAND gate 29 and applied as waveform D to one input of NAND gate 30. NAND gates 31, 32 form a monostable multivibrator of the type well known in the art. The front edge (a negative transition) of each sync pulse of waveform B triggers a pulse of constant width in the multivibrator to produce the waveform C which is connected to a second input of NAND gate 30. Capacitor 33 is a coupling capacitor, resistors 34, 35, 36, 37 increase the input sensitivity of the multivibrator by maintaining the inputs of the gate 31 at a voltage near the trigger level. The pulse duration of waveform C is determined by a capacitor 38 and must be greater than the duration of a horizontal sync pulse. Since a NAND gate has a "low" or logic "zero" output only when both inputs are "high" or logic "one's", the output of gate 30 having waveforms C and D at its inputs will be waveform Ea, the usable sync signal. Ea remains "high" except during the vertical sync pulse period when it contains six serrations corresponding to the six equalizing pulses which occur during the vertical sync pulse.

In the sync signal sensor 21 the input waveform E is applied directly to one input of a NAND gate 40. A second input of gate 40 is connected to a voltage tap 41 of a voltage divider network 42. The network 42 is connected between a voltage supply 43 and the output of the NAND gate 30, and includes two resistors 44, 45, a capacitor 46 and a diode 47. As long as the voltage level of E is high (Ea in FIG. 3), diode 47 will not conduct and the voltage tap 41 will remain at a predetermined level which is high enough to prevent the output F of the gate 40 from going high until the serrations in the vertical sync pulse Ea arrive. The diode 47 will conduct during the serrations in Ea, but since the periods of conduction (and the duty cycle) are short, the capacitor 46 charges very little, and has sufficient time to discharge through resistor 44 between the serrations of Ea. The voltage level at tap 41 does not go low enough to prevent gate 40 from responding to each serration. Thus, in this case, the output Fa of the gate 40 will duplicate the vertical sync pulse Ea but inverted. However, if E is very noisy (shown as Eb) or has a constant "low" (Ec) level (because of a noisy or weak received signal) the diode 47 will conduct for a much longer percentage of time or continuously, allowing current to flow through the voltage divider 42 for a longer percentage of time and tending to keep capacitor 46 charged at too high a level to discharge during a low in E. In this case, the output of the gate 40 will remain high as long as the received signal is less than satisfactory.

The controlled vertical oscillator 23 includes NAND gates 50, 51, capacitor 52, resistors 53, 54, 55 and transistors 56, 57, and, when operating as a free-running oscillator has an output similar to Ea for triggering the monostable multivibrator in the sweep circuit 25. The signal F is connected to one input of the NAND gate 51. The output of the gate 51 is connected to the inputs of the NAND gate 50 where it is inverted and connected by means of the capacitor 52 to the second input of the NAND gate 51. The second input of the gate 51 is also connected to the emitter of the transistor 56 and, through the resistor 53, to the input of the gate 50 and the base of the transistor 56. The collector of the transistor 56 is connected through the resistor 54 to the base of the transistor 57, the transistor base also being connected to ground through the resistor 55. The collector of the transistor 57 is coupled to the terminal 24 and provides the vertical sync signals G which trigger the monostable (not shown) controlling the vertical sweep circuit 25.

Operationally, when satisfactory sync signals are received, Fa is applied to one input of the NAND gate 51, and the output of the gate 51 will stay high until the vertical pulse begins. The output of the gate 50 will be low and the capacitor 52 will be charged to the difference between the "high" and "low", which usually approximates the power supply voltage. When the output of gate 51 goes low on each serration of the vertical pulse, the inputs of the NAND gate 50, one end of the resistor 53 and the base of the transistor 56 will also be low. The output of the gate 50 will then be high. The time constant of the capacitor 52 and the resistor 53 is such that the charge stored on the capacitor 52 does not discharge appreciably during the vertical pulse. Thus, with the base of the transistor 56 low and the emitter high, the transistor 56 becomes forward biased, causing current to flow in resistors 54, 55 and the base of the transistor 57 which in turn transfers the vertical pulse to the terminal 24.

In the other mode of operation, i.e., unsatisfactory received signal, Fb,c stays at a fixed high. This allows the combination of NAND gates 50, 51 and associated components to function as a multivibrator, the rate of which is determined by the time constant of capacitor 52 and resistor 53, and is approximately the same as the repetition rate of the vertical sync pulses. The operation of this type of multivibrator is well known in the art. The circuit thus provides substitute vertical sync pulses to the terminal 24 when the sync signal sensor 21 does not sense the presence of clearly defined vertical sync pulses, thus preventing loss of vertical sweep and subsequent damage to the display screen. In this mode of operation, the pulse G will not be in synchronization with the pulse of the original signal, but will maintain the raster until a satisfactory signal is received.

What is claimed is:

1. An improved digital vertical synchronization circuit arrangement suitable for supplying vertical sync pulses for synchronizing a CRT device having deflection means, and sync separator means for providing a composite sync signal from a received video signal, said synchronization circuit comprising in combination:
   pulse separator means for separating the vertical sync pulses from the composite sync signal;
   means coupled to said pulse separator means for sensing the presence of clearly defined vertical sync pulses and controlling the passage thereof;
   oscillator means responsive to the sensing means for providing substitute vertical sync pulses when the presence of clearly defined received vertical pulses is not sensed and wherein, when the presence of clearly defined vertical sync pulses is sensed, oscillation ceases and the separated vertical sync pulses are passed through the oscillator means; and
   vertical sweep circuit means for receiving pulses from the oscillator means and providing vertical control signals to the deflection means.

2. The digital vertical synchronization circuit arrangement according to claim 1 wherein said sensing means comprises a NAND gate responsive to the separated vertical sync pulse applied to one input thereof in conjunction with said separated vertical sync pulse applied to another input of the NAND gate through a diode and a voltage divider network, whereby the NAND gate output is maintained "high" when the presence of clearly defined vertical sync pulses is not sensed by the sensing means.

3. The digital vertical synchronization circuit arrangement according to claim 1 wherein said oscillator means comprises a circuit arrangement functional as a multivibrator when the presence of clearly defined vertical sync pulses is not sensed and as a feedthrough network when the presence of clearly defined vertical pulses is sensed.

4. The digital vertical synchronization circuit arrangement according to claim 1 wherein the vertical pulse separator comprises a monostable multivibrator and a gating circuit, and the sensing means is responsive to the output of the gating circuit.

5. The digital vertical synchronization circuit arrangement according to claim 4 and wherein the pulse separator means comprises a first NAND gate for receiving and inverting the composite sync signal, a second NAND gate for receiving at a first input the inverted signal from the first gate, and the monostable multivibrator comprises a third and a fourth NAND gates connected to receive the composite sync signal and provide a pulse in response to a negative transition of the composite signal to a second input of said second NAND gate, whereby the second NAND gate provides at the input of the sensing means a signal representative of the vertical sync pulse.

* * * * *